United States Patent
Stern-Berkowitz et al.

(10) Patent No.: US 8,909,271 B2
(45) Date of Patent: Dec. 9, 2014

(54) METHOD AND APPARATUS FOR SUPPORTING POSITIONING MEASUREMENTS

(75) Inventors: Janet A. Stern-Berkowitz, Little Neck, NY (US); Marian Rudolf, Montreal (CA); Charles A. Dennean, Melville, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 334 days.

(21) Appl. No.: 12/856,171

(22) Filed: Aug. 13, 2010

(65) Prior Publication Data

US 2011/0039577 A1 Feb. 17, 2011

Related U.S. Application Data (60) Provisional application No. 61/233,655, filed on Aug. 13, 2009.

(51) Int. Cl.
- H04B 7/00 (2006.01)
- G01S 5/10 (2006.01)
- G01S 5/02 (2010.01)
- H04W 64/00 (2009.01)
- H04W 24/10 (2009.01)

(52) U.S. Cl.
CPC .............. *G01S 5/10* (2013.01); *G01S 5/0205* (2013.01); *H04W 64/00* (2013.01); *H04W 24/10* (2013.01)
USPC ............... 455/502; 455/404.2; 455/432.3; 455/456.1; 455/405

(58) Field of Classification Search
CPC ............ H04W 56/00; H04W 56/0005; H04W 56/001; H04W 64/00; H04W 24/10
USPC ............ 455/432.1, 432.3, 434, 435.1, 435.2, 455/435.3, 436, 446, 447, 502, 456.1, 455/456.2, 456.3, 456.5; 370/329, 335, 370/338, 350
See application file for complete search history.

(56) References Cited

U.S. PATENT DOCUMENTS

| | | | |
|---|---|---|---|
| 6,166,685 A * | 12/2000 | Soliman | 342/357.29 |
| 6,216,007 B1 | 4/2001 | Havinis et al. | |
| 7,995,458 B2 * | 8/2011 | Kwak et al. | 370/208 |
| 8,185,787 B1 * | 5/2012 | Marrow et al. | 714/721 |
| 2003/0081571 A1 * | 5/2003 | Hur | 370/331 |
| 2005/0070283 A1 * | 3/2005 | Hashimoto et al. | 455/435.1 |
| 2008/0096566 A1 * | 4/2008 | Brunner et al. | 455/437 |

(Continued)

FOREIGN PATENT DOCUMENTS

| | | |
|---|---|---|
| CN | 1913702 A | 2/2007 |
| CN | 101339238 | 1/2009 |

(Continued)

OTHER PUBLICATIONS

Ericsson, et al., "WF on RAN1 Concept for OTDOA," R1-092213, RAN 1 Meeting #57.

(Continued)

Primary Examiner — Jean Gelin
(74) Attorney, Agent, or Firm — Yasser Mourtada (57) ABSTRACT

A method and apparatus for supporting positioning measurements. The methods include designating a reference cell, choosing a positioning signal, and, for inter-frequency measurements, determining which inter-frequency cell to measure and how to make such an inter-frequency positioning measurement.

19 Claims, 6 Drawing Sheets

(56) References Cited

U.S. PATENT DOCUMENTS

| | | | |
|---|---|---|---|
| 2008/0285529 A1* | 11/2008 | Kwak et al. | 370/338 |
| 2009/0286552 A1* | 11/2009 | Wu | 455/456.2 |
| 2010/0113021 A1* | 5/2010 | Vare et al. | 455/436 |
| 2010/0279691 A1* | 11/2010 | Dwyer et al. | 455/436 |
| 2011/0117925 A1* | 5/2011 | Sampath et al. | 455/456.1 |
| 2011/0201345 A1* | 8/2011 | Han et al. | 455/450 |
| 2012/0040696 A1* | 2/2012 | Siomina et al. | 455/456.6 |
| 2012/0108270 A1* | 5/2012 | Kazmi et al. | 455/456.5 |
| 2013/0315168 A1* | 11/2013 | Frank et al. | 370/329 |

FOREIGN PATENT DOCUMENTS

| | | |
|---|---|---|
| JP | 2004-535728 | 11/2004 |
| KR | 2006-0117150 | 11/2006 |
| TW | 2008410362 | 10/2008 |
| WO | WO-03/007508 | 1/2003 |
| WO | WO-2005/057954 | 6/2005 |
| WO | WO-2008/085532 | 7/2008 |
| WO | WO-2008/127161 | 10/2008 |
| WO | WO-2009/096839 | 8/2009 |

OTHER PUBLICATIONS

Ericsson, et al., "Draft CR 36.214 Introduction of LTE Positioning," 3GPP TSG-RAN WG1 Meeting #57bis, Los Angeles, USA (Jun. 29-Jul. 3, 2009).

ETSI MCC, "Draft Report of 3GPP TSG RAN WG2 Meeting #66, San Francisco, USA, May 4-8, 2009," TSG-RAN Working Group Meeting 2 Meeting #66bis, Los Angeles, USA, (Jun. 29-Jul. 3, 2009).

Third Generation Partnership Project, "Technical Specification Group Radio Access Network; Stage 2 Functional Specification of User Equipment (UE) Positioning in UTRAN (Release 1999)," 3GPP TS 25.305 v3.11.0 (Dec. 2003).

Third Generation Partnership Project, "Technical Specification Group Radio Access Network; Stage 2 Functional Specification of User Equipment (UE) Positioning in UTRAN (Release 4)," 3GPP TS 25.305 v4.7.0 (Dec. 2004).

Third Generation Partnership Project, "Technical Specification Group Radio Access Network; Stage 2 Functional Specification of User Equipment (UE) Positioning in UTRAN (Release 5)," 3GPP TS 25.305 v5.9.0 (Jun. 2004).

Third Generation Partnership Project, "Technical Specification Group Radio Access Network; Stage 2 Functional Specification of User Equipment (UE) Positioning in UTRAN (Release 6)," 3GPP TS 25.305 v6.1.0 (Jun. 2004).

Third Generation Partnership Project, "Technical Specification Group Radio Access Network; Stage 2 Functional Specification of User Equipment (UE) Positioning in UTRAN (Release 7)," 3GPP TS 25.305 v7.4.0 (Oct. 2007).

Third Generation Partnership Project, "Technical Specification Group Radio Access Network; Stage 2 Functional Specification of User Equipment (UE) Positioning in UTRAN (Release 8)," 3GPP TS 25.305 v8.1.0 (Dec. 2008).

Third Generation Partnership Project, "Technical Specification Group Radio Access Network; Stage 2 Functional Specification of User Equipment (UE) Positioning in UTRAN (Release 9)," 3GPP TS 25.305 v9.0.0 (Jan. 2010).

Third Generation Partnership Project, "Technical Specification Group Radio Access Network; Evolved Universal Terrestrial Radio Access (E-UTRA); Requirements for Support of Radio Resource Management (Release 8)," 3GPP TS 36.133 v8.6.0 (May 2009).

Third Generation Partnership Project, "Technical Specification Group Radio Access Network; Evolved Universal Terrestrial Radio Access (E-UTRA); Requirements for Support of Radio Resource Management (Release 8)," 3GPP TS 36.133 v8.10.0 (Jun. 2010).

Third Generation Partnership Project, "Technical Specification Group Radio Access Network; Evolved Universal Terrestrial Radio Access (E-UTRA); Requirements for Support of Radio Resource Management (Release 9)," 3GPP TS 36.133 v9.0.0 (May 2009).

Third Generation Partnership Project, "Technical Specification Group Radio Access Network; Evolved Universal Terrestrial Radio Access (E-UTRA); Requirements for Support of Radio Resource Management (Release 9)," 3GPP TS 36.133 v9.4.0 (Jun. 2010).

"Canadian Office Action", Canadian Application No. 2770319, Nov. 15, 2013, 3 pages.

"Chinese First Office Action", Chinese Patent Application No. 201080035909.0, Mar. 26, 2013, 19 pages.

"Chinese First Office Action (English Translation)", Chinese Patent Application No. 201080035909.0, Mar. 26, 2013, 15 pages.

"Japanese Notice of Rejection", Japanese Patent Application No. 2012-524900, Jun. 18, 2013, 2 pages.

"Japanese Notice of Rejection (English Translation)", Japanese Patent Application No. 2012-524900, Jun. 18, 2013, 2 pages.

"KR 20060117150A Machine Translation", Nov. 16, 2006, 1 page.

"Singapore Search and Final Examination Substantative Report", Patent Application No. 201200943-7, Apr. 18, 2013, 145 pages.

Ericsson, "Framework of OTDOA Positioning Requirements", 3GPP TSG-RAN WG4 Meeting #51bis, R4-092345, Los Angeles, CA, USA, Jun. 29-Jul. 2, 2009, 6 pages.

Motorola, "Study on hearability of reference signals in LTE positioning support", 3GPP TSG RAN1 #56bis, R1-091336, Seoul, South Korea, Mar. 23-29, 2009, 8 pages.

QUALCOMM Europe, "UE Positioning: Measurement Requirements and Accuracy Indicators", 3GPP TSG RAN WG2 Meeting #22, Tdoc R2-011621, Berlin, Germany, Jul. 9-13, 2001, 12 pages.

"3GPP Tdoc R2-020529, Change Request 25.305 CR 074 V5.3.0", 3GPP TSG-RAN WG2 Meeting #26, Orlando, USA, Feb. 18-22, 2002, 8 pages.

"3rd Generation Partnership Project, Technical Specification Group Radio Access Network, Stage 2 functional specification of User Equipment (UE) positioning in UTRAN (Release 8)", 3GPP TS 25.305 V8.0.0, Dec. 2007, 79 pages.

"3rd Generation Partnership Project; Technical Specification Group Radio Access Network; Radio Resource Control (RRC); Protocol Specification (Release 8)", 3GPP TS 25.331 V8.6.0, Mar. 2009, 1, 673 pages.

"EP Communication pursuant to Article 94(3) EPC", EP Application No. 10762781.2, Jul. 9, 2014, 7 pages.

"Japanese Final Notice of Rejection", Japanese Application No. 2012-524900, Jun. 17, 2014, 3 pages.

"Japanese Final Notice of Rejection (English Translation)", Japanese Application No. 2012-524900, Jun. 17, 2014, 4 pages.

"Taiwan Office Action", Taiwan Application No. 099127095, Jul. 28, 2014, 6 pages.

"Taiwan Office Action "English Translation"", Taiwan Application No. 099127095, Jul. 28, 2014, 4 pages.

Ericsson, "DL OTDOA framework", 3GPP Tdoc R1-092010, 3GPP TSG RAN WG1 Meeting #57, San Francisco, USA, May 4-8, 2009, 4 pages.

* cited by examiner

METHOD AND APPARATUS FOR SUPPORTING POSITIONING MEASUREMENTS

CROSS REFERENCE TO RELATED APPLICATION

This application claims the benefit of U.S. provisional application No. 61/233,655, filed Aug. 13, 2009, the contents of which is hereby incorporated by reference herein.

BACKGROUND

Support of wireless transmit/receive unit (WTRU)-based and WTRU-assisted observed time difference of arrival (OTDOA) methods has been identified as one technique to improve upon achievable accuracy and speed for positioning in a long term evolution (LTE) system.

For OTDOA methods, a WTRU observes signals of several neighbor cells, measures the observed time differences of arrival (for example, as compared to its own serving cell), and reports these to the network. In one method, the network then derives a positioning estimate based on factors such as known deployment locations of the reported neighbor signals, known transmission time differences among various cells in the network, and the like. This is referred to as WTRU-assisted positioning. Alternatively, the network provides the factors to the WTRU so that the WTRU computes its own position from the measurements using these factors and the observed time differences of arrival measurements. This is referred to as WTRU-based positioning.

WTRU time difference measurements may be defined based on one or more reference signals (RS) from the cells being measured. The RS may be either Release 8 LTE Cell-Specific RS (CRS) and/or a newly designed Positioning RS (PRS). Either may be used individually or in combination by the WTRU to derive the measured metrics. As a result, the WTRU may need to know which RS to use for the time difference measurements.

The time difference measurement that may be used for OTDOA calculations may be the Reference Signal Time Difference (RSTD). The RSTD may be defined as the relative timing difference between a cell j and cell i, which may be defined as $T_{SubframeRxj} - T_{SubframeRxi}$, where $T_{SubframeRxj}$ is the time when the WTRU receives the start of one subframe from cell j and $T_{SubframeRxi}$ is the time when the WTRU receives the corresponding start of one subframe from cell i that is closest in time to the subframe received from cell j. The reference point for the observed subframe time difference may be the antenna connector of the WTRU. The RSTD measurement may be applicable to intra-frequency and inter-frequency cells. The WTRU, therefore, needs to support measurements made on neighbor cell carrier frequencies that are different than the serving cell carrier frequency.

SUMMARY

A method and apparatus for supporting positioning measurements. The methods include designating a reference cell, choosing a positioning signal, and for inter-frequency measurements, determining which inter-frequency cell to measure and how to make such an inter-frequency positioning measurement.

BRIEF DESCRIPTION OF THE DRAWINGS

A more detailed understanding may be had from the following description, given by way of example in conjunction with the accompanying drawings wherein.

DETAILED DESCRIPTION

Figure 1A:
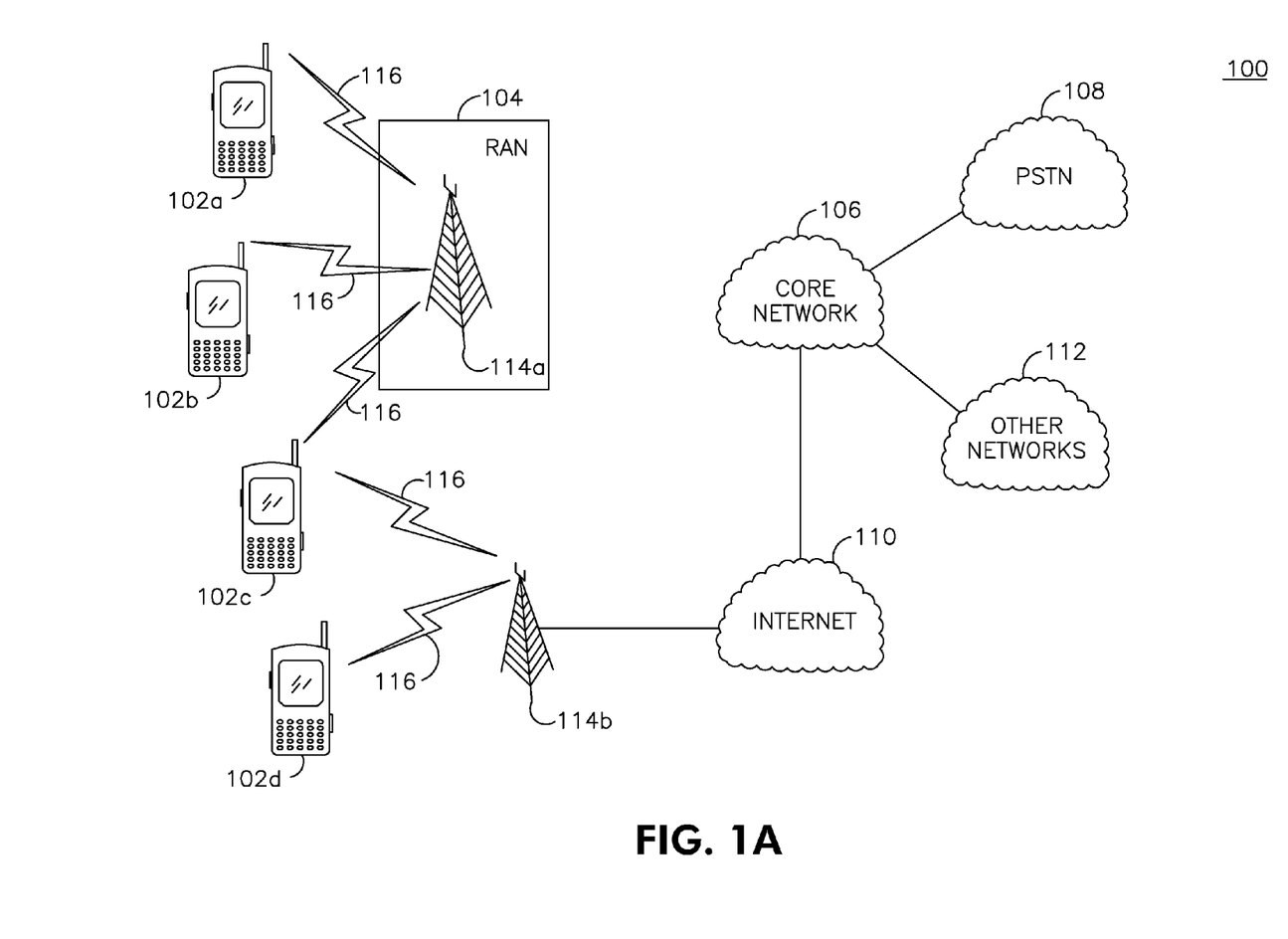
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) technology.

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
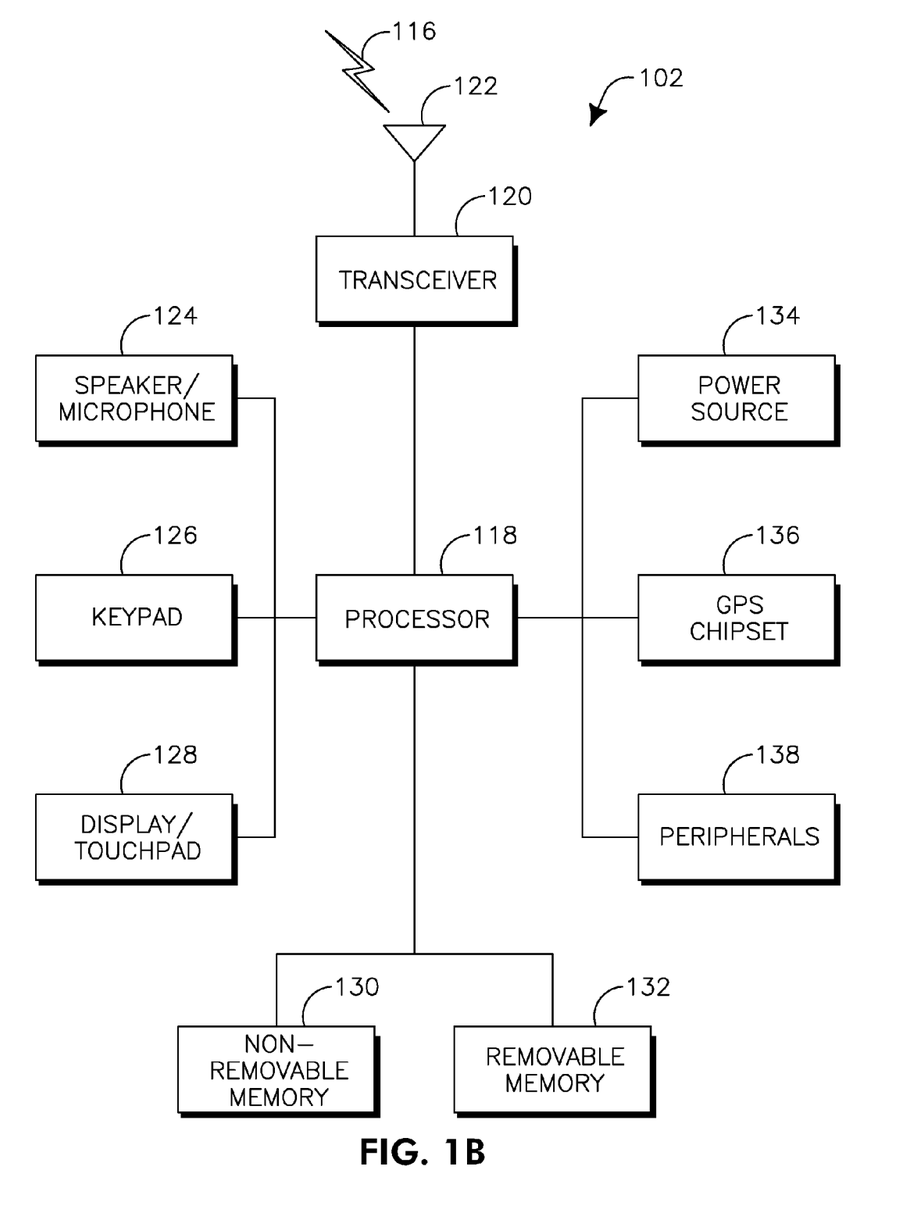
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA, E-UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
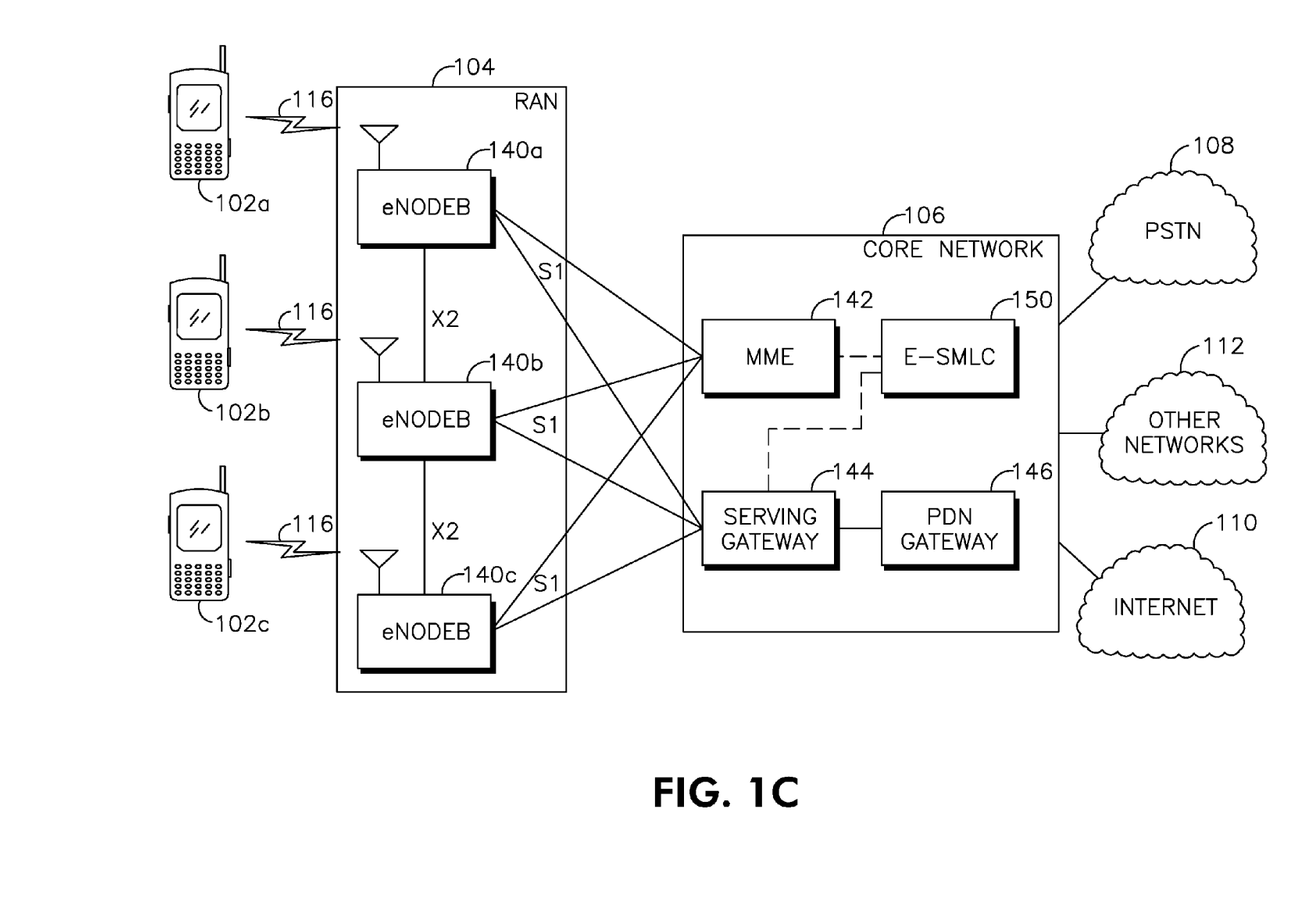
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The MME 142 or serving gateway 144 may interface with an evolved serving mobile location center (E-SMLC) 150 for at least control plane positioning support and for sending location information to or receiving location information from the WTRUs 102a, 102b, 102c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
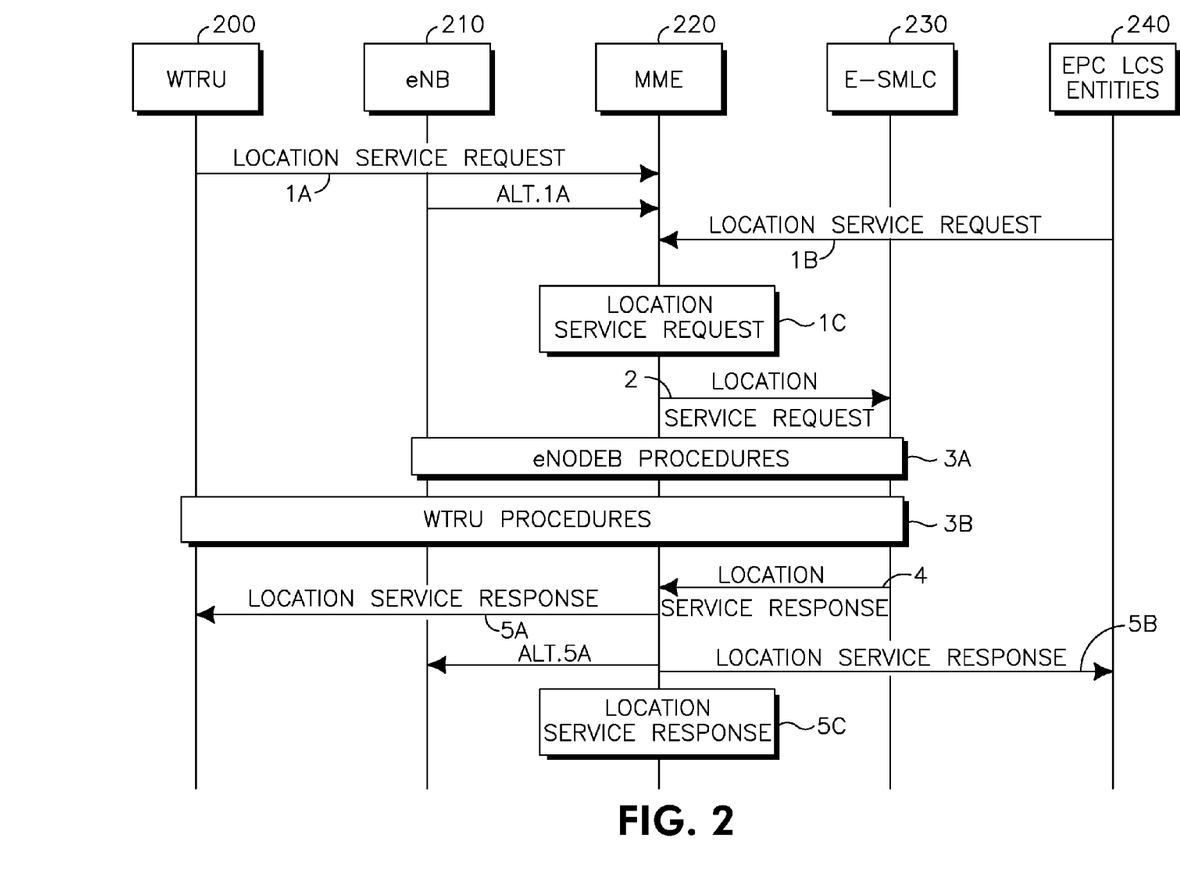
FIG. 2 shows an example location service support flow in Evolved Universal Mobile Telecommunications System (UMTS) Terrestrial Radio Access Network (E-UTRAN)

Focusing on the control plane only, location service support flow is shown with respect to FIG. 2. A WTRU 200 or an eNB 210 may request some location service (e.g., positioning or delivery of assistance data) from the serving MME 220 at the non-access stratum (NAS) level (1a). Alternatively, an entity in the evolved packet core (EPC) 240 (e.g., Gateway Mobile Location Centre (GMLC)) may request some location service (e.g. positioning) for a target WTRU to the serving MME 220 (1b). Alternatively, the serving MME 220 for a target WTRU 200 may determine the need for some location service (e.g. to locate the WTRU 200 for an emergency call) (1c).

The MME may then transfer the location service request to an E-SMLC 230 (2). The E-SMLC 230 may then instigate location procedures with the serving eNB 210 for the WTRU 200, e.g., to obtain positioning measurements or assistance data (3a). In addition or instead of step 3a, the E-SMLC 230 may instigate location procedures with the WTRU 200, (e.g., to obtain a location estimate or positioning measurements or to transfer location assistance data to the WTRU 200 (3b)). The E-SMLC 230 may then provide a location service response to the MME 220 and include any needed results, e.g., a success or failure indication and, if requested and obtained, a location estimate for the WTRU (4).

If step 1a was performed, the MME 220 may return a location service response to the WTRU 200 (or the eNB 210) and include any needed results, (e.g., a location estimate for the WTRU 200 (5a)). If step 1b was performed, the MME 220 may return a location service response to the EPC entity in step 1b and include any needed results, (e.g., a location estimate for the WTRU (5b)). If step 1c occurred, the MME 220 may use the location service response received in step 4 to assist the service that triggered this in step 1c, (e.g., may provide a location estimate associated with an emergency call to a GMLC) (5c).

Figure 3:
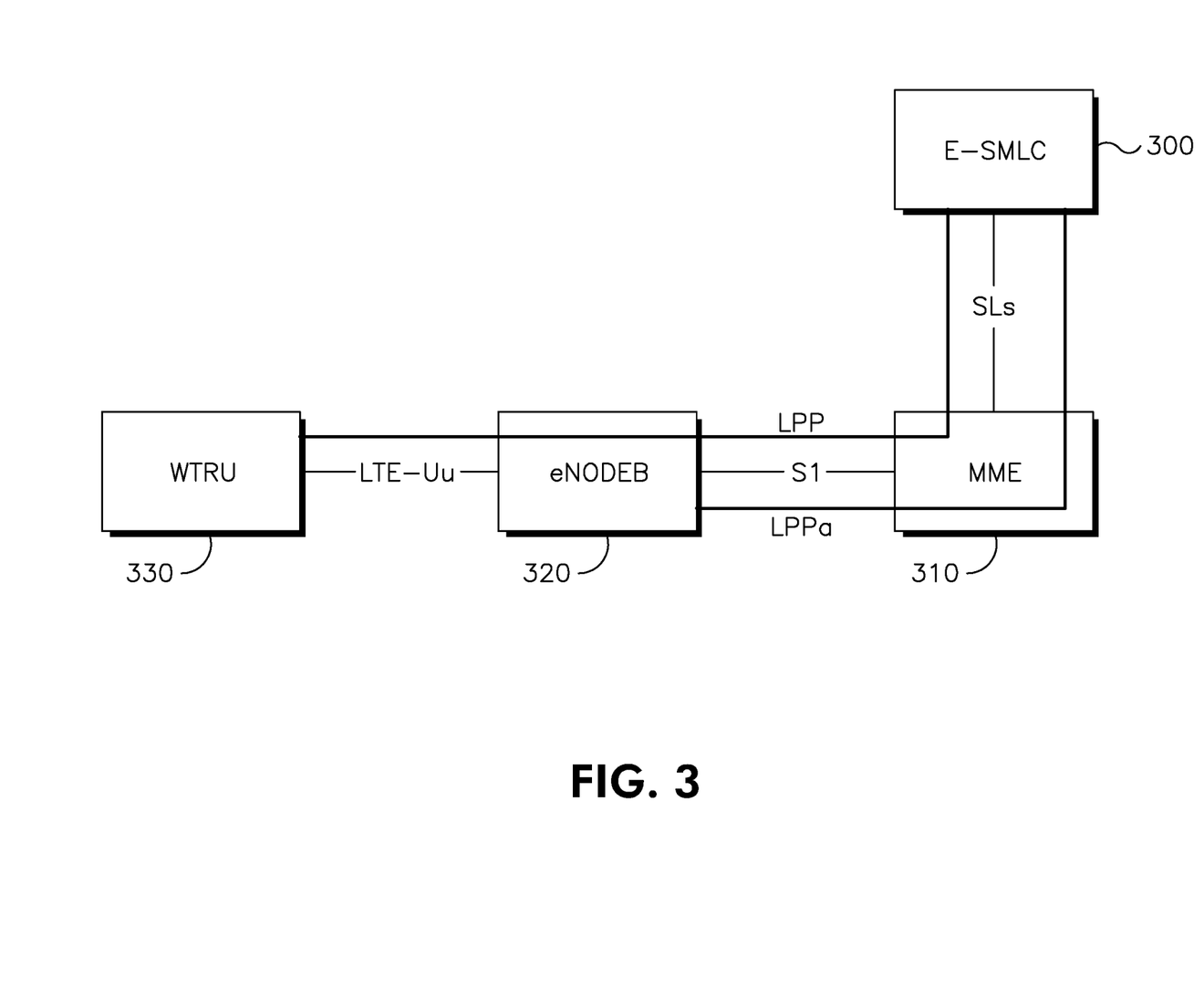
FIG. 3 shows example positioning protocols in a long term evolution (LTE) positioning architecture.

FIG. 3 shows the two protocols that may be used for support of positioning: LTE positioning protocol (LPP) and LTE positioning protocol a (LPPa). The LPP protocol is a point-to-point protocol between the E-SMLC 300 and the WTRU 330. The LPP passes through the MME 310 and eNB 320 to the WTRU. The LPPa protocol may be used for transfer of positioning related information (e.g., PRS scheduling information) between the eNB 320 and the E-SMLC 300.

For OTDOA methods, a WTRU observes signals of several neighbor cells, measures the observed time differences of arrival (for example, as compared to its own serving cell), and reports these to the network. In one method, the network then derives a positioning estimate based on factors such as known deployment locations of the reported neighbor signals, known transmission time differences among various cells in the network, and the like. This is referred to as WTRU-assisted positioning. Alternatively, the network provides the factors to the WTRU so that the WTRU computes its own position from the measurements using these factors and the observed time differences of arrival measurements. This is referred to as WTRU-based positioning.

WTRU time difference measurements may be defined based on one or more reference signals (RS) from cells being measured. The RS may be either Release 8 LTE Cell-Specific RS (CRS) and/or a newly designed Positioning RS (PRS). Either may be used individually or in combination by the WTRU to derive the measured metrics.

The PRS to be used by the WTRU for positioning purposes may be contained in either normal subframe(s), or in Multi-Media Broadcast over a Single Frequency Network (MB-SFN)-reserved subframes. The PRS bandwidth may be configurable, e.g., up to the system bandwidth in a subframe.

Without loss of generality and for illustration purposes, more than one positioning subframe allocation may be needed by the WTRU to accumulate enough energy to get to one measurement sample for one or more specific neighbors. For example, 1, 2, 4 or 6 consecutive positioning subframes may be needed to derive one sample. Furthermore, positioning subframes may typically occur in certain periodicities, (e.g. 16, 32, 64, or 128 radio frames, and positioning occasions may be semi-statically configured and coordinated among neighboring eNodeBs).

MBSFN-reserved subframes, when used as positioning subframes, may have the same PRS pattern as normal subframes. Specifically, the same PRS pattern may be used in all PRBs used for positioning in frequency dimension in one subframe. The PRS pattern(s) similar to the CRS in Release 8 LTE may be generated as a function of the Physical Cell ID (PCI) as one input parameter.

Assistance data may be provided to the WTRU through higher layer signaling such as radio resource control (RRC) or LPP signaling.

The time difference measurement that may be used for OTDOA calculations may be the Reference Signal Time Difference (RSTD). The RSTD may be defined as the relative timing difference between a cell j and cell i, which may be defined as $T_{SubframeRxj} - T_{SubframeRxi}$, where $T_{SubframeRxj}$ is the time when the WTRU receives the start of one subframe from cell j and $T_{SubframeRxi}$ is the time when the WTRU receives the corresponding start of one subframe from cell i that is closest in time to the subframe received from cell j. The reference point for the observed subframe time difference may be the antenna connector of the WTRU. The RSTD measurement may be applicable to intra-frequency cell measurements and inter-frequency cell measurements.

When making inter-frequency measurements, the WTRU may need to tune its receiver to the appropriate downlink (DL) carrier frequency and may therefore not be able to receive on the serving cell DL frequency. In addition, many common WTRU RF implementations may use frequency synthesizers where a single oscillator may be employed to derive both DL receive (Rx) and uplink (UL) transmit (Tx) frequencies. This radio frequency (RF) architecture may be facilitated by the use of common DL-UL frequency duplex distances in 3G and LTE technology. Therefore, when the WTRU tunes its DL Rx frequency for measurement purposes to a different DL frequency channel than the one employed by its own serving cell, the WTRU may not be able to simultaneously transmit on the UL Tx frequency channel in use in that serving cell either. In addition, some DL frequency channels in certain 3G or LTE frequency bands may be too close to UL frequency channels of other 3G or LTE bands, such that a DL measurement may not be reliably performed without self-interference from concurrent UL transmissions by the WTRU even where the WTRU RF architecture may support such separate tuning of DL Rx and UL Tx frequencies.

Although the methods described herein are shown in terms of OTDOA and RSTD, the methods are applicable to any positioning measurements and positioning methods. Moreover, although the methods described herein are described in particular combinations, each method and/or part of each method may be used alone or in combination with other methods or parts of other methods.

Methods are described herein for choosing between a CRS or PRS. In one method, the WTRU may determine whether to use CRS or PRS for positioning measurements based on the existence of a PRS. The WTRU may know of the existence and subframe allocation of the PRS in the serving cell based on high layer signaling. The information may be broadcast or sent via dedicated signaling.

For example, if PRS exists in the serving cell, the WTRU may use it for determining serving cell timing for use in positioning measurements, for example RSTD. In another example, the WTRU may use PRS for determining timing relative to the serving cell, such as RSTD, of any intra-frequency cells that transmit PRS in the same subframes as the serving cell, (i.e., the WTRU looks for PRS of other cells in the same subframe as the PRS of the serving cell and determines their relative timing to the serving cell, for example, RSTD). In a further example, the WTRU may use the PRS for determining timing relative to the serving cell, such as RSTD, of any intra-frequency cells that transmit PRS in subframes that are different from those containing PRS of the serving cell, but are known to the WTRU, (e.g., in the case of asynchronous PRS transmission where the WTRU is told, for example, the system frame number (SFN) offset between the neighbor cell and serving cell transmissions).

In another method, if the serving cell does not support PRS, then the WTRU may use CRS for both the serving cell and each other cell that may be used for positioning measurements, and for determining the relative time difference between each cell and the serving cell, such as for RSTD in support of OTDOA.

In another method, if a cell to be measured does not support PRS, then the WTRU may make the RSTD measurement for that cell and the serving cell based on CRS measurements for both cells.

In another method, the WTRU may make an RSTD measurement using PRS for one cell and CRS for the other cell.

In another method, explicit higher layer signaling may be used to tell the WTRU whether to use CRS or PRS. For example, the E-SMLC may signal the WTRU via LPP signaling whether PRS should be used for the serving cell, and for which other cells. The default may be to use CRS, i.e., if the WTRU is not told to use PRS, then the WTRU may use CRS.

In another method, if a cell, serving or other, supports PRS, then the WTRU may use PRS for the positioning measurement for that cell. If a cell, serving or other, does not support PRS, then the WTRU may use CRS for the positioning measurement for that cell.

In another method, higher layer signaling may be used to tell the WTRU whether or not each cell to be measured supports PRS. If the WTRU is not told that a cell to be measured supports PRS, then the WTRU may assume that it does not support PRS.

In another method, higher layer signaling may be used to tell the WTRU whether or not each cell to be measured is synchronized in its transmission of PRS with the serving cell. The higher layer signaling may allow for the possibility of informing the WTRU that all cells (or all cells to be measured) are synchronized in their transmission of the PRS with the serving cell. This may be done using, for example, a single bit.

In another method, if PRS is to be used for the measurement, but the PRS measurement is of poor quality, then the WTRU may attempt to use CRS. If both PRS and CRS are of poor quality, the WTRU may discard the RSTD measurement.

In another method, threshold parameters may be provided to the WTRU by the network for use in determining whether the RS measurements are of sufficient quality for acceptable RSTD measurements.

In another method, the WTRU may use either CRS or PRS measurements depending on which provides the better quality. For each of the serving cell and other cell, the WTRU may use CRS or PRS based on the individual quality. Alternatively, for both the serving cell and other cell, the WTRU may use CRS or PRS (same for both) based on the individual qualities and/or the combined quality.

Described herein are methods for designating and using reference cells.

In an example method for designating a reference cell, the network may tell the WTRU which cell is the reference cell for positioning measurements. The reference cell may or may not be the serving cell. Allowing a reference cell to be a cell other than the serving cell may provide benefits such as the ability to continue positioning through handover. That is, the WTRU may continue positioning measurements and measurement reporting after handover without changes to reference or neighbor cells or the need for new assistance data.

In one embodiment, if the WTRU is not told which cell is the reference cell, then the default reference cell may be the serving cell.

In an example method of when the reference cell is not the serving cell, the existence and subframe allocation of the PRS may be provided to the WTRU via high layer signaling.

If the WTRU is not told of the existence of PRS and/or what the subframe allocation is for the PRS in the reference cell, then the default may be the same as the serving cell. That is, if the WTRU is not told of the existence of PRS in the reference cell, then the existence of PRS in the reference cell is the same as the existence of PRS in the serving cell. If the WTRU is not told the subframe allocation of PRS in the reference cell, then the subframe allocation in the reference cell is the same as the subframe allocation of PRS in the serving cell.

Alternatively, if the WTRU is not told of the existence of PRS in the reference cell, then the WTRU understands that PRS is not supported in the reference cell. If the WTRU is told that PRS exists in the reference cell but is not told the subframe allocation of PRS in the reference cell, then the subframe allocation in the reference cell is the same as the subframe allocation of PRS in the serving cell.

Alternatively, if the WTRU is not told of the existence of PRS in the reference cell, then the WTRU understands that PRS is not supported in the reference cell. If the WTRU is told that PRS exists in the reference cell but is not told the subframe allocation of PRS in the reference cell, then this may be seen as an error and the WTRU may act as if PRS is not configured in the reference cell.

In an example method of when PRS exists in the reference cell, the WTRU uses it for determining reference cell timing for use in positioning measurements, for example RSTD.

In another example method, if PRS exists in the reference cell and the reference cell is an intra-frequency cell, the WTRU may use PRS for determining timing relative to the reference cell, for example RSTD, of any intra-frequency cells that transmit PRS in the same subframes as the reference cell, i.e., the WTRU may look for PRS of other cells in the same subframe as PRS of the reference cell and determine their relative timing to the reference cell, for example RSTD.

In another example method, if PRS exists in the reference cell and the reference cell is an intra-frequency cell, the WTRU may use it for determining timing relative to the serving cell, for example RSTD, of any intra-frequency cells that transmit PRS in subframes that are different from those containing PRS of the reference cell, but are known to the WTRU. For example, as in the case of asynchronous PRS transmission where the WTRU may be told the SFN offset between the neighbor cell and reference cell transmissions (or the SFN offset between the neighbor cell and the serving cell and the reference cell and the serving cell so that it can derive the SFN offset between the neighbor cell and reference cell transmissions).

In an example method of when the reference cell does not support PRS, then the WTRU may use CRS for both the reference cell and each other cell used for positioning measurements for determining the relative time difference between each cell and the reference cell, for example for RSTD in support of OTDOA.

In an example method of when a cell to be measured does not support PRS, then the WTRU measurement of RSTD for that cell may be based on CRS measurements for both that cell and the reference cell.

In an example method, explicit higher layer signaling may be used to tell the WTRU whether to use CRS or PRS. For example, the E-SMLC may signal the WTRU via LPP signaling whether PRS should be used for the reference cell, and for which of the non-reference cells. In the case of explicit signaling, the default may be to use CRS, i.e., if the WTRU is not told to use PRS, then the WTRU may use CRS.

In an example method of when a cell, reference or other, supports PRS, then the WTRU may use PRS for the measurement for that cell. If a cell, reference or other, does not support PRS, then the WTRU may use CRS for the measurement for that cell.

In an example method, higher layer signaling may be used to tell the WTRU whether or not each non-reference cell to be measured supports PRS. If the WTRU is not told that a non-reference cell to be measured supports PRS, then the WTRU understands that it does not support PRS.

In another example method, higher layer signaling may be used to tell the WTRU whether or not each non-reference cell to be measured is synchronized in its transmission of PRS with the reference cell. The higher layer signaling may allow for the possibility of informing the WTRU that all non-reference cells (or all non-reference cells to be measured) are synchronized in their transmission of the PRS with the reference cell, for example using a single bit.

In another example method, the WTRU may use either CRS or PRS measurements depending on which provides the better quality. For each of the reference cell and non-reference cell, the WTRU may use CRS or PRS based on the individual quality. Alternatively, for both the reference cell and neighbor cell, the WTRU may use CRS or PRS (same for both) based on the individual qualities and/or the combined quality.

Described herein are methods for performing inter-frequency RSTD measurements.

In an example method, for inter-frequency neighbor cells to be used for positioning measurements, for example for OTDOA measurements, the carrier frequency(ies) of the cell(s) may be provided to the WTRU by the network.

In an embodiment of the example method, for inter-frequency neighbor cells to be used for positioning measurements, for example for OTDOA measurements, the carrier frequency(ies) of the cell(s) may be provided to the WTRU by the network as part of assistance data. Assistance data messages containing such inter-frequency cells indicated for positioning measurements by the WTRU may be realized through RRC or LPP signaling exchanges with one or more network nodes, such as eNB(s) or E-SMLC(s), with the WTRU. Alternatively, other protocol messages may be used, such as for example, medium access control (MAC) control packet data units (PDU(s)) or equivalent messages.

In one embodiment, the evolved absolute radio frequency channel number (EARFCN) of the inter-frequency cell(s) indicated for positioning measurements may be provided in the assistance data.

In another embodiment, the carrier frequency(ies) of the inter-frequency cell(s) indicated for positioning measurements may be provided to the WTRU by the E-SMLC via LPP signaling.

In another method, the WTRU may determine which carrier frequencies and/or inter-frequency cells to measure for positioning purposes, for example for OTDOA measurements, based on existing carrier frequency list(s) and/or inter-frequency neighbor cell list(s) already provided to the WTRU by one or more network nodes, such as the eNodeB(s), for mobility handling purpose and the like.

In one embodiment, either all or some of the carrier frequencies and/or inter-frequency cells indicated for other measurement purposes such as mobility handling may qualify as inter-frequency measurement candidates for positioning purposes for the WTRU.

In another embodiment, carrier frequencies and/or inter-frequency cells otherwise discarded by the WTRU for measurement purposes (such as for mobility handling) due to specific measurement rules in that context, may be considered by the WTRU as valid measurement candidates for positioning purposes.

In another embodiment, the WTRU may determine which carrier frequencies and/or inter-frequency cells to measure for positioning purposes based on the carrier frequencies and/or inter-frequency cells provided to the WTRU in the InterFreqCarrierFreqList and/or the InterFreqNeighList provided through RRC signaling.

In another embodiment, the WTRU may determine which frequency channels and/or inter-frequency cells to evaluate for positioning purposes based on existing measurement lists and may not preclude cells in the InterFreqBlackCellList from measurements to be used for positioning.

In another embodiment, the WTRU may exclude from inter-frequency measurements for positioning any carrier frequencies and/or candidate cells that are not provided in the inter-frequency neighbor carrier and/or cell list(s) provided by the eNB. For example, in the case where the E-SMLC provides carrier frequencies of the inter-frequency cells to be measured for positioning purposes, if there are frequencies in that list that are not also included in the inter-frequency neighbor carrier and/or cell list(s) provided by the eNB, the WTRU may exclude those frequencies from positioning measurements.

In another embodiment, in the case where the E-SMLC provides a list of inter-frequency cells to be measured for positioning purposes, if there are inter-frequency cells in that list that are not also included in the inter-frequency neighbor cell list(s) provided by the eNB, the WTRU may exclude those cells (the ones not on the inter-frequency neighbor cell list(s) provided by the eNB) from positioning measurements.

In an example method, the cells the WTRU measures for positioning purposes may be limited to those whose strength or reception quality is good enough or deemed reliable enough as determined by other measurements.

In one embodiment, those other measurements used in this determination may be reference signal received power (RSRP) and/or reference signal received quality (RSRQ).

In another embodiment, if the RSRP and/or RSRQ measurements do not exceed specified thresholds, the WTRU may exclude the related cell(s) and/or the related frequency(s) from positioning measurements.

In another embodiment, the threshold parameters may be provided to the WTRU by the network for use in determining if applicable signal strength or signal quality levels, for example based on RSRP and/or RSRQ measurements, are good enough to consider specific cells and/or specific carrier frequencies for positioning measurements.

In another embodiment, the WTRU may configure applicable signal strength or signal quality levels based on its own measurements and without intervention of the network.

In another embodiment, different signal strength or reception quality thresholds may be configured in the WTRU for different measurement objects. For example, a first signal quality threshold may apply to a first frequency channel used for positioning purposes, and a second, possibly different signal quality threshold may apply to a second frequency channel used for positioning purposes, and so on.

In an example method, the serving eNB may inform the E-SMLC of the strength and/or quality of measurements reported by the WTRU to enable the E-SMLC to determine which cells and/or which frequencies the WTRU should measure subsequently.

In an embodiment, the eNB may inform the E-SMLC of the WTRU's measurements of RSRP and/or RSRQ. This information may be signaled using LPPa signaling.

In an example method, when a WTRU may be told by the E-SMLC to perform inter-frequency positioning measurements, the E-SMLC may also inform the serving eNB for that WTRU. In a further example, the E-SMLC may inform the eNB using LPPa signaling. The E-SMLC may also inform the eNB that inter-frequency positioning measurements may be required of the specific WTRU and may optionally include the carrier frequencies and/or the cell IDs of the cell or cells to be measured. In yet a further example, the eNB may also configure measurement gaps in the WTRU as needed to support these inter-frequency measurements.

In an example method, the serving eNB may inform the E-SMLC of the carrier frequencies of the cells for which the WTRU may be reporting measurements. For example, this may include the carrier frequencies of the cells for which the WTRU may be reporting RSRP and/or RSRQ. The E-SMLC is thus aware of the carrier frequencies the WTRU is already hearing and measuring. This information may be signaled using LPPa signaling.

In an example method, the serving eNB may inform the E-SMLC of the cell IDs of the inter-frequency cells, and optionally all cells, the WTRU may be reporting measurements for. For example, this may include the cell IDs of the cells for which the WTRU is reporting RSRP and/or RSRQ. Thus, the E-SMLC is aware of the cells the WTRU is already hearing and measuring. This information may be signaled using LPPa signaling.

In an example method, the WTRU capability for inter-frequency measurements may be expanded to include RSTD measurements. For example, the WTRU may be required to be capable of performing RSRP, RSRQ, and RSTD measurements of at least 4 inter-frequency cells per frequency division duplex (FDD) inter-frequency carrier for up to 3 FDD inter-frequency carriers.

In an example method, the WTRU may have a requirement for inter-frequency RSTD measurements stating that the WTRU be capable of performing RSTD measurements of at least X inter-frequency cells per FDD inter-frequency carrier for up to Y FDD inter-frequency carriers. In one example, X=2 or 3 and Y=1 or 2. A similar requirement may be imposed for time division duplex (TDD).

In an example, the WTRU may limit the number of inter-frequency cells and/or carrier frequencies for which it makes RSTD measurements such that the total number of inter-frequency cells and carrier frequencies for which it makes any measurements does not exceed the capabilities required for RSRP and RSRQ.

For example, the WTRU may be capable of performing RSRP and RSRQ measurements of at least 4 inter-frequency cells per FDD inter-frequency carrier for up to 3 FDD inter-frequency carriers. If the WTRU, for example, were making RSRP/RSRQ measurements on 3 inter-frequency cells per FDD inter-frequency carrier for each of 2 FDD inter-frequency carriers, then the capability requirement for RSTD would support measurement on the cells already measured for RSRP/RSRQ plus an additional 1 more cell on the existing 2 frequencies plus up to 4 cells on a $3^{rd}$ frequency.

Figure 4:
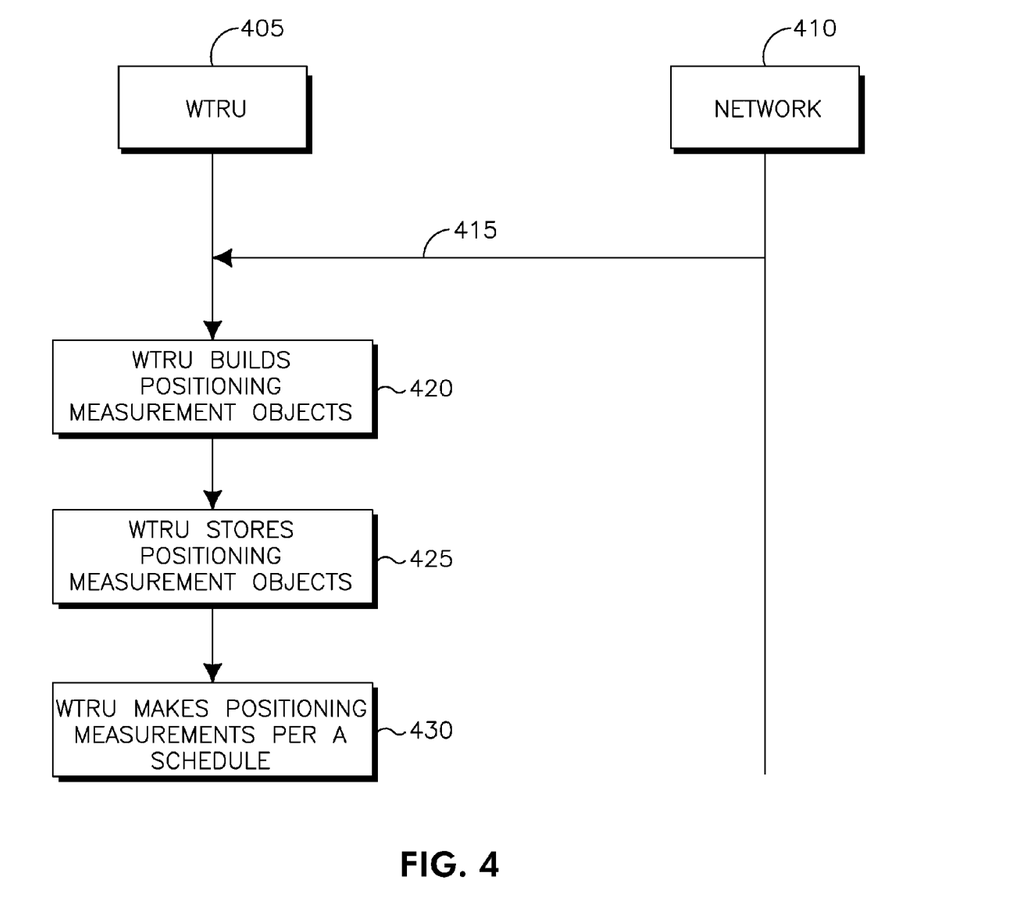
FIG. 4 shows an example flow diagram.

Described herein is an example method that a WTRU 405 may follow using the methods described herein. The WTRU 405 may receive and store configured inter-frequency measurement objects from the network 410 (415). For example, an eNodeB or E-SMLC may send list(s) of measurement objects to the WTRU 405 through RRC or LPP protocol message exchanges. Inter-frequency measurement objects may comprise carrier frequencies other than the current serving cell frequency, or inter-frequency cells including their respective identifiers. The WTRU 405 may then build the list of valid positioning measurement objects based on either one or more filtering criteria (420).

One filtering criteria may result in having some measurement objects excluded from the positioning candidate list. For example, a frequency not also indicated by the eNB on the inter-frequency mobility list, may not be usable by the WTRU 405 for positioning measurements. Other filtering criteria may result in one or more measurement objects being precluded from the list if signal strength or signal quality measurements indicate low reliability. In yet another filtering criteria example, the list of measurement objects may be completed by including certain cells or frequencies not considered in the context of inter-frequency measurements for other measurement purposes. For example, black-listed cells may be included for positioning purposes.

The WTRU 405 then stores the list of measurement objects for positioning purposes (425) and starts executing positioning measurements according to a measurement schedule (430).

In addition to the initial building of the measurement object list, the same or a different set of filter criteria may be used to refresh the list of valid measurement objects for positioning purposes. This may be done at update intervals. For example, reception of a new list of inter-frequency channels may trigger an update to the measurement object list. Alternatively or additionally, a cell reaching sufficient signal strength or signal quality may be included for positioning purposes.

Methods for determining which signals to measure for inter-frequency measurements are described herein. In one example method, only CRS may be used for RSTD for inter-frequency cells. For example, while PRS and CRS both may be configured for the purpose of positioning measurements on the serving cell frequency, only CRS may be used on inter-frequency cells. In another method, the rules for choosing CRS versus PRS may apply for both intra-frequency and inter-frequency cells.

Described herein are methods for determining how many subframes may be available for measurement accumulation. In one example method, the number of subframes available for accumulation ($N_{PRS}$) for inter-frequency PRS measurements may be different from the number of subframes available for accumulation for intra-frequency PRS measurements. For example, the number of subframes available for accumulation ($N_{PRS}$) for inter-frequency PRS measurements may be less than the number of subframes available for accumulation for intra-frequency PRS measurements.

In an example method, the number of subframes available for accumulation ($N_{PRS}$) for inter-frequency PRS measurements may be signaled to the WTRU. For example, the number of subframes available for accumulation ($N_{PRS}$) for inter-frequency PRS measurements may be signaled to the WTRU as a separate parameter from the number of subframes available for accumulation for intra-frequency PRS measurements.

In an example method, the number of subframes to use for accumulation ($N_{PRS}$) for inter-frequency PRS measurements may be a fixed number. For example, the number of subframes to use for accumulation ($N_{PRS}$) for inter-frequency PRS measurements may be one subframe.

Described herein are methods for determining when to measure inter-frequency cells. In an example method, a network configured measurement gap may be used for performing inter-frequency RSTD measurements. The rules for DL reception and UL transmission during measurement gaps may apply. That is, during the measurement gap, the WTRU may not transmit any data and is not expected to tune its receiver on the E-UTRAN serving cell carrier frequency.

In another example method, the gap identified for inter-frequency E-UTRAN measurements (for example RSRP and RSRQ measurements) may also be used for the inter-frequency RSTD measurements.

In another example method, a new measurement gap may be defined and used for the inter-frequency RSTD measurements. The gap length, the gap period, and the gap starting subframe may be provided to the WTRU by the network. The gap parameters may be flexible enough to allow the patterns to overlay on the PRS patterns totally or in part. Additionally, the WTRU may not be required to make any UL transmissions during this gap such as sounding reference signal (SRS), acknowledgement/negative acknowledgement (ACK/NACK), channel quality indicator (CQI) reports, and the like. Additionally, the WTRU may not be expected to tune its receiver on the E-UTRAN serving cell carrier frequency during this gap.

In another example method, given $N_{PRS}$ may be the number of subframes allocated for PRS, the WTRU may use some of the subframes for intra-frequency PRS measurements and some of the subframes for inter-frequency PRS measurements. For example, the WTRU may use the last X subframes (or alternatively the first X subframes) of the $N_{PRS}$ subframes to do the inter-frequency measurements. The value of X may be known (fixed) or signaled to the WTRU. During the subframes used for inter-frequency measurements and any subframe(s) used for transition between reception and/or operation on different carrier frequencies, the WTRU may not be required to make any UL transmissions, such as SRS, ACK/NACK, CQI reports, and the like. The WTRU may not be expected to tune its receiver on the E-UTRAN serving cell carrier frequency during the subframe(s) used for inter-frequency measurements.

In another example method, cells transmitting with different carrier frequencies may not transmit PRS in exactly the same subframes. The allocations may partially overlap or not overlap at all. For purposes of illustration only, consider cell1 transmitting with carrier frequency f1 using allocation pattern 1 and cell2 transmitting with carrier frequency f2 using allocation pattern 2. Allocation pattern 2 may be the same as allocation pattern 1, but shifted in time by a fixed number of subframes. In another illustration, allocation pattern 1 may be 4 subframes every 16 frames beginning in subframe 0 of system frame number (SFN) 0 and allocation pattern 2 may be the same pattern, but beginning in subframe 4 of SFN 0. In this example, there would be 8 consecutive subframes for PRS where the first 4 are for cells transmitting on f1 and the second 4 are for cells transmitting on f2. In another example, allocation pattern 2 may be different from allocation pattern 1.

In this example method, the WTRU may be signaled the allocation patterns for the inter-frequency cells. This may be on a cell basis or on a carrier frequency basis. During the subframes used for inter-frequency measurements and any subframe(s) used for transition between reception and/or operation on different carrier frequencies, the WTRU may not required to make any UL transmissions, such as SRS, ACK/NACK, CQI reports, and the like. The WTRU may not be expected to tune its receiver on the E-UTRAN serving cell carrier frequency during the subframe(s) used for inter-frequency measurements.

In another example method, cells transmitting with different carrier frequencies may not transmit PRS in exactly the same subframes. The carrier frequencies may be placed in groups and each group may have a subframe allocation defined. All cells with a carrier frequency in a particular group may use the same subframe allocation.

In this example method, the WTRU may be told the allocation patterns for the inter-frequency cells. This may be on a cell basis, on a carrier frequency basis, or on a group basis. For the group basis case, a means may be provided for the WTRU to know which frequencies are in each group. This may be fixed or signaled. During the subframes used for inter-frequency measurements and any subframes used for transition between reception and/or operation on different carrier frequencies, the WTRU may not be required to make any UL transmissions, such as SRS, ACK/NACK, CQI reports, and the like. Additionally, the WTRU may not be expected to tune its receiver on the E-UTRAN serving cell carrier frequency during the subframe(s) used for inter-frequency measurements.

In another example method, the E-SMLC may provide information to the eNB(s) related to the configuration of WTRUs making inter-frequency PRS measurements such that the eNB(s) may be able to configure measurement gaps accordingly. This information may include the carrier frequencies for which the WTRU is being asked to make RSTD measurements. LPPa signaling may be used for this communication.

In another example method, the measurement gap to use for inter-frequency measurements may be implicitly configured by the PRS subframe allocation, i.e., the network signaling the information regarding the subframe allocation of the inter-frequency PRS signals to the WTRU implies that a measurement gap is configured. The WTRU may understand that this is a measurement gap and during this gap may not be required to receive in the DL or transmit in the UL on the serving cell.

In an example method, cells transmitting with different carrier frequencies may transmit PRS in the same subframes.

The WTRU may be told which period of the PRS allocation to use for intra-frequency measurements and which to use for inter-frequency measurements. For example, the WTRU may be told to use every Nth period of the PRS allocation for inter-frequency measurements, where N may be an integer greater than or equal to 1. The default value of N may be 1 and the WTRU may not need to be informed by signaling if N is 1. Moreover, if N is always 1, no additional signaling may be required to inform the WTRU.

In this example method, during the subframes used for inter-frequency measurements and any subframes used for transition between reception and/or operation on different carrier frequencies, the WTRU may not be required to make any UL transmissions, such as SRS, ACK/NACK, CQI reports, and the like. It is noted that during these subframes designated for inter-frequency PRS measurements, the WTRU may need to tune its receiver to the serving (or other reference) cell carrier frequency at the beginning of the period for some length of time (for example, some number of subframes) to obtain the reference timing for the measurements of the other cells. Except as stated above, the WTRU may not be expected to tune its receiver on the E-UTRAN serving carrier frequency during the subframe(s) used for inter-frequency measurements.

In one method, when the reference cell supports PRS, the OTDOA assistance data for the reference cell includes the PRS information for the reference cell and the OTDOA assistance data for a neighbor cell includes the PRS information for the neighbor cell if it is not the same as the PRS information of the reference cell. PRS information may include the PRS bandwidth, the PRS configuration index, where the PRS configuration index may be an index into a table which provides the subframe allocation for the PRS (where the subframe allocation identifies in which subframes PRS will be transmitted), and the like.

In the case where the reference cell supports PRS and a neighbor cell does not, a means is needed to inform the WTRU that the neighbor does not support PRS. This may be done in one or more of the following methods. In one example method, in the PRS information for the neighbor cell, the PRS bandwidth may be set to a specific value that is interpreted by the WTRU to mean PRS is not supported in the neighbor cell. For example, the PRS bandwidth may be set to a value that is not a valid PRS bandwidth value, which may, for example, be a value of all zeroes or all ones.

In another example method, in the PRS information for the neighbor cell, the PRS configuration index may be set to a specific value that is interpreted by the WTRU to mean PRS is not supported in the neighbor cell. For example, one of the reserved values may be used such as 4095.

In another example method, in the PRS information for the neighbor cell, specific values may be used for two or more of the parameters (the values may be the same or different for the different parameters) to indicate that PRS is not supported in the neighbor cell. For example, all the values may be set to 0. The WTRU may interpret the combination of parameter values to mean that PRS is not supported in the neighbor cell.

Although features and elements are described above in particular combinations, one of ordinary skill in the art will appreciate that each feature or element can be used alone or in any combination with the other features and elements.

In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for supporting positioning measurements, comprising:
   designating a base station cell as a reference cell;
   designating at least one other base station cell as a non-reference cell;
   transmitting reference cell information and non-reference cell information to a wireless transmit/receive unit (WTRU) that makes the positioning measurements with respect to the reference cell and the non-reference cell, wherein the positioning measurements are used to determine a position of the WTRU; and
   transmitting information for the non-reference cell that indicates that a transmission of a positioning reference signal (PRS) by the non-reference cell is synchronized with a transmission of a PRS by the reference cell.

2. The method of claim 1, wherein the reference cell is not a serving cell.

3. The method of claim 1, further comprising:
   transmitting information for the reference cell to the WTRU on a condition that the reference cell supports PRS.

4. The method of claim 3, wherein the information for the reference cell includes subframe allocation information.

5. The method of claim 3, further comprising detecting an absence of a receipt of the information for the reference cell and determining non-support of PRS in accordance with the detecting.

6. The method of claim 1, further comprising:
   transmitting at least one carrier frequency with respect to at least one interfrequency cell being used for the positioning measurements.

7. The method of claim 6, wherein the at least one carrier frequency is provided as assistance data.

8. The method of claim 7, wherein assistance data is signaled via one of radio resource control or long term evolution positioning protocol signaling.

9. The method of claim 1, further comprising detecting an absence of information for a neighboring cell and determining that PRS information of the neighboring cell is identical to PRS information of the reference cell.

10. A method for supporting positioning measurements at a wireless device, comprising:
    receiving reference cell information associated with a reference cell from a network, wherein the reference cell corresponds to a base station cell;
    receiving non-reference cell information associated with a non-reference cell, wherein the non-reference cell corresponds to one other base station cell;
    receiving information for the non-reference cell that indicates that a transmission of a positioning reference signal (PRS) by the non-reference cell is synchronized with a transmission of a PRS by the reference cell; and
    making positioning measurements using the reference cell information and the non-reference cell information, wherein the positioning measurements are used to determine a position of the wireless device.

11. The method of claim 10, further comprising:
receiving information for the reference cell on a condition that the reference cell supports PRS.

12. The method of claim 11, wherein the information for the reference cell includes subframe allocation information.

13. The method of claim 11, further comprising:
determining lack of positioning reference signal (PRS) support by the reference cell from lack of signaling of PRS information for the reference cell.

14. The method of claim 10, further comprising:
receiving at least one carrier frequency with respect to at least one inter-frequency cell being used for positioning measurements.

15. The method of claim 14, wherein the at least one carrier frequency is provided as assistance data.

16. The method of claim 15, wherein the assistance data is signaled via one of radio resource control or long term evolution positioning protocol signaling.

17. A wireless device, comprising:
a receiver configured to receive reference cell information associated with a reference cell from a network, wherein the reference cell corresponds to a base station cell;
the receiver configured to receive non-reference cell information associated with a non-reference cell, wherein the non-reference cell corresponds to one other base station cell;
a processor in communication with the receiver;
a transmitter in communication with the processor;
the processor configured to make positioning measurements using the reference cell information and the non-reference cell information;
the processor further configured to use the positioning measurements to determine a position of the wireless device; and
the receiver further configured to receive information for the non-reference cell that indicates that a transmission of a positioning reference signal (PRS) by the non-reference cell is synchronized with a transmission of a PRS by the reference cell.

18. The wireless device of claim 17, wherein the reference cell is not a serving cell.

19. The wireless device of claim 17, wherein the receiver is configured to receive information for the reference cell on a condition that the reference cell supports PRS, wherein the information includes PRS subframe allocation information.

* * * * *

UNITED STATES PATENT AND TRADEMARK OFFICE
CERTIFICATE OF CORRECTION

| | | |
|---|---|---|
| PATENT NO. | : 8,909,271 B2 | Page 1 of 1 |
| APPLICATION NO. | : 12/856171 | |
| DATED | : December 9, 2014 | |
| INVENTOR(S) | : Janet Stern-Berkowitz, Marian Rudolf and Charles Dennean | |

It is certified that error appears in the above-identified patent and that said Letters Patent is hereby corrected as shown below:

On the Title Page

In References, under Foreign Pat. Doc., page 2, line 3, "TW 2008410362" should be replaced with ---TW 200841036---.

Signed and Sealed this
Seventh Day of April, 2015

Michelle K. Lee
*Director of the United States Patent and Trademark Office*